United States Patent [19]

Nakagawa et al.

[11] Patent Number: 5,164,890
[45] Date of Patent: Nov. 17, 1992

[54] CURRENT SHARE SCHEME FOR PARALLEL OPERATION OF POWER CONDITIONERS

[75] Inventors: Sam Nakagawa, Torrance; Bailey M. Fong, Cerritos, both of Calif.

[73] Assignee: Hughes Aircraft Company, Los Angeles, Calif.

[21] Appl. No.: 501,999

[22] Filed: Mar. 29, 1990

[51] Int. Cl.⁵ .......................................... H02M 3/337
[52] U.S. Cl. ........................................ 363/65; 363/17; 363/71
[58] Field of Search ....................... 363/17, 21, 67, 71, 363/65; 323/272

[56] References Cited

U.S. PATENT DOCUMENTS

| | | | |
|---|---|---|---|
| 4,276,590 | 6/1981 | Hansel et al. | 363/71 |
| 4,425,613 | 1/1984 | Shelly | 363/26 |
| 4,717,833 | 1/1988 | Small | 307/44 |
| 4,841,161 | 6/1989 | Lentini et al. | 307/85 |
| 4,924,170 | 5/1990 | Henze | 323/272 |

Primary Examiner—William H. Beha, Jr.
Attorney, Agent, or Firm—Leonard A. Alkov; Wanda K. Denson-Low

[57] ABSTRACT

A current sharing circuit for each of a plurality of parallel coupled power conditioners, each current sharing circuit for each power conditioner having a filtering circuit responsive to a voltage signal representative of the input current to the associated power conditioner for providing an averaged signal indicative of the average load current for the associated power conditioner. The averaged signals for all of the current share circuits are summed at a summing node to provide a reference voltage signal indicative of the average load current for the parallel coupled power conditioners. Each current share circuit further includes a differential circuit for providing a difference signal indicative of the difference between the average load current and the averaged signal, and an output circuit for adding the difference signal with the associated power conditioner output voltage to provide a feedback signal for the error amplifier of the associated power conditioner.

5 Claims, 2 Drawing Sheets

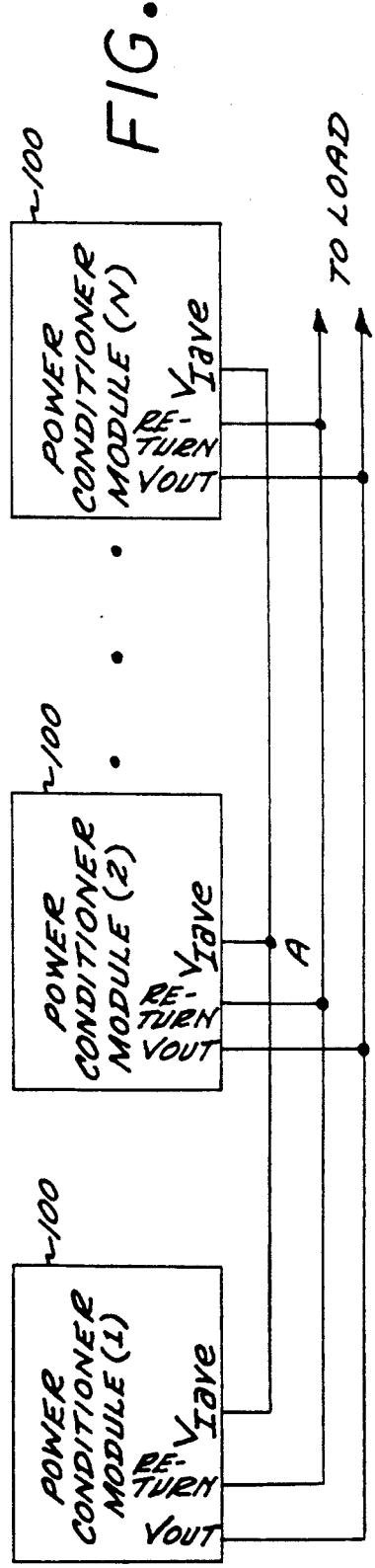
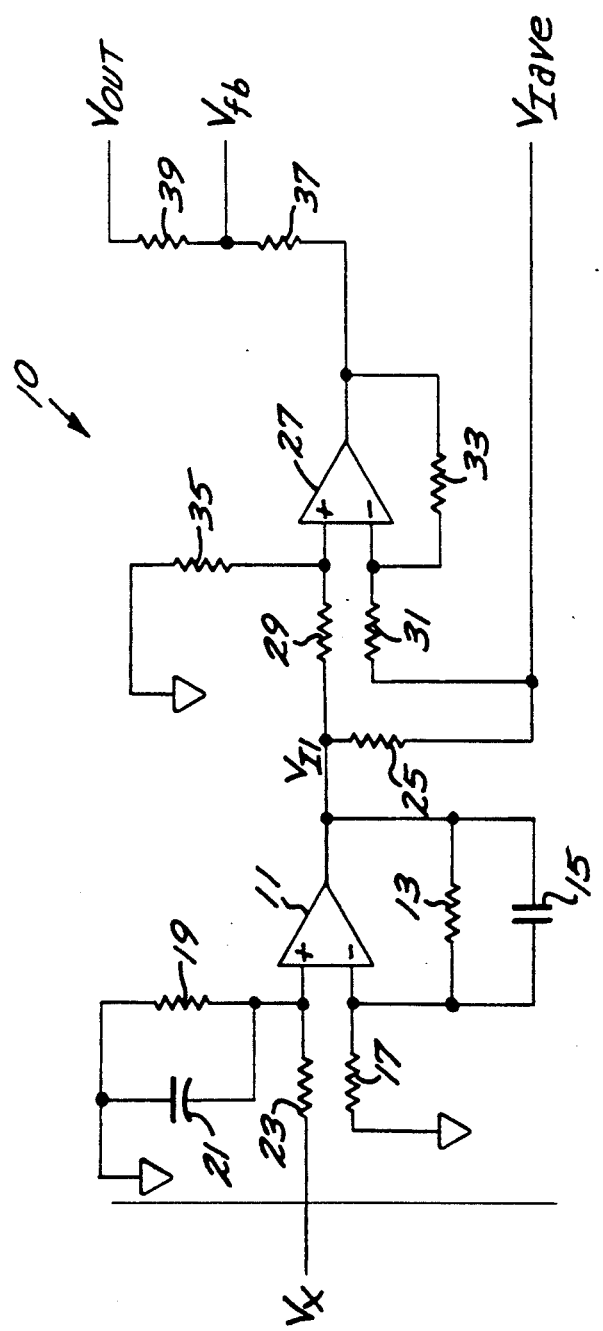

CURRENT SHARE SCHEME FOR PARALLEL OPERATION OF POWER CONDITIONERS

BACKGROUND OF THE INVENTION

The disclosed invention is directed generally to power conditioners, and more particularly to current sharing circuitry for distributing the load current among feedback controlled power conditioners coupled in parallel.

In order to efficiently satisfy different power system requirements economically, power system architecture designs have been directed to the use of parallel coupled, feedback controlled modular power conditioners, each of which is capable of delivering a packet of power. In particular, the number of parallel operating power conditioner modules is varied depending on the required load level.

The operability of a power system having parallel coupled power conditioners depends on load current sharing between the power conditioners. Typically, the output voltage of each power conditioner has been designed to droop with increasing current load, with current sharing being enhanced with greater voltage droop. However, designed-in droop results in poor voltage regulation.

SUMMARY OF THE INVENTION

It would therefore be an advantage to provide a load current sharing circuit for parallel coupled, feedback controlled power conditioners that does not adversely affect voltage regulation.

The foregoing and other advantages are provided by the invention in a current sharing circuit for each of a plurality of parallel coupled power conditioners having respective error amplifiers for controlling the respective power conditioner outputs, each current sharing circuit for each power conditioner including an averaging circuit responsive to the input current to the associated power conditioner for providing an averaged signal indicative of the average load current for the associated power conditioner, a summing node common to the current sharing circuits for the parallel coupled power conditioners for summing the averaged signals to provide a reference signal indicative of the average load current for all of the power conditioners, a difference amplifier for providing a difference signal indicative of the difference between the average load current and the averaged signal, and an output circuit for adding the difference signal with the associated power conditioner voltage output to produce a feedback signal for the error amplifier of the associated power conditioner.

BRIEF DESCRIPTION OF THE DRAWING

The advantages and features of the disclosed invention will readily be appreciated by persons skilled in the art from the following detailed description when read in conjunction with the drawing wherein:

FIG. 1 is a block diagram illustrating the interconnection of parallel coupled power conditions and the respective current sharing circuitry in accordance with the invention for a multiple power conditioner power system.

FIG. 2 is a schematic diagram of a current sharing circuit in accordance with the invention for one of the power conditioners in the power system of FIG. 1.

DETAILED DESCRIPTION OF THE DISCLOSURE

Figure 3:
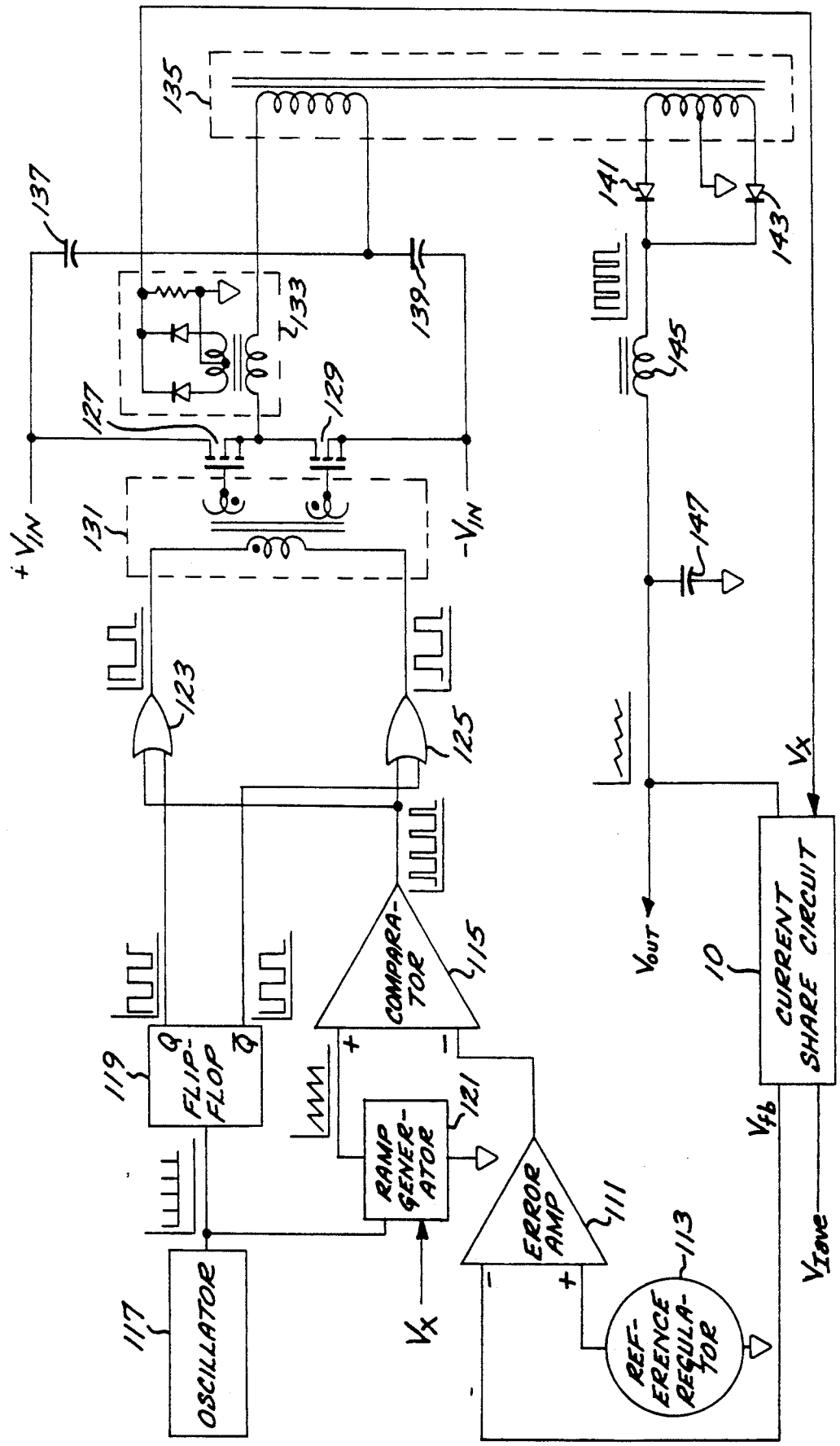
FIG. 3 a circuit schematic of the current sharing circuit of FIG. 1 as integrated with a half bridge pulse width modulated DC-DC converter.

In the following detailed description and in the several figures of the drawing, like elements are identified with like reference numerals.

Referring now to FIG. 1 shown therein is a power system that includes a plurality of parallel coupled power conditioner modules 100 which have their outputs connected together and their returns (e.g., ground) connected together. As described further herein, the power conditioners include respective current sharing circuits connected to a node A.

Referring now to FIG. 2, set forth therein is a schematic of a current sharing circuit 10 that is utilized with each power conditioner 100. The current sharing circuit 10 includes an operational amplifier 11 having a resistor 13 and a capacitor 15 connected in parallel between its output and its inverting input. A resistor 17 is connected between a common reference potential such as ground and the inverting input of the operational amplifier 11.

A resistor 19 and a capacitor 21 are connected in parallel between ground and the non-inverting input of the operational amplifier 11. A voltage $V_x$ representative of the current input to the associated power conditioner is coupled to the non-inverting input of the operational amplifier 11 via a resistor 23.

The voltage $V_x$ can be provided by known circuitry such as a current sampling transformer, or a current sampling resistor. It should be appreciated, however, that a current sampling resistor might be considered inappropriate since it would be dissipative and would not provide isolation. It should also be appreciated that a voltage $V_x$ representative of current input is readily available in power conditioners generally known as current mode control power conditioners, an example of which is shown in FIG. 3.

A primary function of the operational amplifier 11 and its associated circuitry is to filter the voltage $V_x$ to provide an output voltage $V_I$ that represents the average load current of the associated power conditioner, and also to provide any requisite gain, depending on the amplitude of the voltage $V_x$.

The output of the operational amplifier 11 is connected to a resistor 25 which has its other end connected to the node A. By this connection, the voltage output $V_I$ of the operational amplifier 11 is summed through the resistor 25 at the node A with its counterparts from the other current sharing circuits 10 of the other power conditioners 100 in the power system.

By making the connections at the node A, the voltage at the node A represents the average current of all the power conditioners 100, and the voltage across the resistor 25 represents the difference between (a) the current of the associated power conditioner and (b) the average current.

The output of the operational amplifier 11 is coupled to the non-inverting input of an operational amplifier 27 via a resistor 29. A resistor 31 is connected between the node A and the inverting input of the operational amplifier 27, and a feedback resistor 33 is connected between the output of the operational amplifier 27 and its inverting input. A resistor 35 is connected between ground and the non-inverting input of the operational amplifier 27.

The operational amplifier 27 is configured as a differential amplifier for amplifying the difference voltage developed across the resistor 25, and the value of the resistor 29 is equal to the value of the resistor 31, and with the value of the resistor 33 is equal to the value of the resistor 35. The gain of the operational amplifier is substantially equal to the value of the resistor 33 divided by the value of the resistor 31.

The output of the operational amplifier 27 is representative of the difference between the average load current of the associated power conditioner and the average load current for all of the power conditioners in the power system. The output voltage of the operational amplifier 27 is zero if the load current of the associated power conditioner is equal to the average load current for all of the power conditioners in the power system.

The voltage output of the operational amplifier 27 is summed with the output voltage $V_{out}$ of the associated power conditioner via resistors 37, 39 which are serially connected between the output of the operational amplifier 27 and the output voltage $V_{out}$ of the associated power conditioner. The resultant voltage $V_{fb}$ at the node between the resistors 37, 39 is a modified feedback voltage that is provided to the error amplifier of the associated power conditioner. The voltage $V_{fb}$ is called a "modified" feedback signal since in a power conditioner without a current share circuit the feedback voltage would typically be the power conditioner voltage output or some voltage representative of that voltage output. By way of illustrative example, the current share circuit is phased such that, if the power conditioner is supplying more than the average load current, the circuit causes the feedback voltage $V_{fb}$ to increase. The error amplifier of the power conditioner is phased to reduce the power conditioner output voltage in response to an increased feedback voltage.

Referring now to FIG. 3, shown therein by way of illustrative example is a schematic diagram of a half-bridge pulse width modulated (PWM) switching DC-DC power conditioner with feedback control that can be utilized with the current share circuit 10 of FIG. 2. The power conditioner includes an error amplifier 111 which receives the modified feedback voltage $V_{fb}$ from the current share circuit 10 at its inverting input. A reference regulator 113 provides the input for the non-inverting input of the error amplifier 111, which has its output connected to the inverting input of a comparator 115.

The output of an oscillator 117 is provided to a flip-flop 119 and a ramp generator 121. The output of the ramp generator, which is connected to the non-inverting input of the comparator 115, is controlled by the voltage $V_x$ and is synchronized to the oscillator. The flip-flop output and its complement are respectively provided as inputs to NOR-gates 123, 125, which have power output stages to provide the necessary power for driving the converter switches comprising power FETs 127, 129. The output of the comparator 115 provided as inputs to both NOR-gates 123, 125.

The outputs of the NOR-gates 123, 125 are respectively connected to the ends of the primary winding of a driver transformer 131 that includes two secondary windings. Such secondary windings are connected to the gates of the power FETs 127, 129 that are serially connected between a positive voltage $V_{in}$ and and a negative voltage $-V_{in}$. By way of example, the positive and negative voltages $\pm V_{in}$ can be the unregulated, rectified output of an AC power source. The node between the power FETs 127, 129 is coupled via a current sensing transformer circuit 133 to one end the the primary winding of a power output transformer 135. The other end of the primary winding of the output power transformer 135 is connected to the node between capacitors 137, 139 that are serially connected between the positive voltage $V_{in}$ and the negative voltage $-V_{in}$. The current sensing transformer circuit 133, which includes diodes connected to its secondary winding, provides the voltage $V_x$ for the current share circuit 10.

The voltage at the secondary winding of the output power transformer 135 is full-wave rectified by diodes 141, 143. The rectified voltage is filtered by a low pass filter comprising an inductor 145 and a capacitor 147 to provide the power conditioner output $V_{out}$.

The PWM converter is a switching regulator that converts unregulated DC voltage to regulated DC voltage by varying the converter switch "on time" with respect to its period, "on time" plus "off time," and generally operates as follows.

A fraction of the converter output voltage $V_{out}$ is fed back to the error amplifier 111 via the resistor divider network in the current share circuit 10. The feedback voltage is modified by the current share circuit 10 to force current sharing among parallel connected converters as described above. The error amplifier 111 is a differential amplifier that amplifies the voltage difference between the feedback voltage and the reference voltage to provide an error voltage to the comparator 115 which compares the amplified error voltage with the ramp voltage. For current mode operation, the ramp voltage is a function of the converter current. The pulse width modulation occurs when the ramp voltage exceeds the amplified error voltage, and the output of the comparator 115 switches from a low state to a high state. The comparator switches back to the low state when the oscillator 117 resets the ramp generator 121 and the amplified error voltage exceeds the ramp voltage.

The modulated pulsewidth signal from the comparator 115 is supplied to the steering circuit comprising the flip-flop 119 and two NOR gates 123, 125. The flip-flop 119 steers the modulated pulsewidth signal from the comparator 115 to one of the two NOR-gates 123, 125 alternately. The output of the NOR gates is followed by the drive transformer 131 which provides the necessary outputs with proper phasing and isolation required by the bridge converter FET switches 127, 129.

The FET switches 127, 129, connected in a half bridge configuration, in conjunction with the input voltages, $\pm V_{in}$ superimpose a quasi-square wave voltage across the primary of the output power transformer 13 as dictated by the pulsewidth modulated signal from the NOR gates 123, 125. The voltage at the output transformer 135 secondary, a replica of the primary voltage, is rectified by two diodes connected in a full-wave configuration. A low-pass filter consisting of an inductor and a capacitor follows the rectifiers. The output of the low pass filter is a low ripple DC voltage that is regulated.

By way of particular example, the PWM converter can be implemented with an integrated circuit pulse width modulation controller such as the UC 3825 High Speed PWM Controller available from Unitrode Integrated Circuits, 7 Continental Blvd., Merrimack, N.H. 03054, which includes an error amplifier.

While the current share circuit of the invention has been describe relative the particular illustrative example of a switching type power conditioner, it should be appreciated that it can be utilized with other types of power conditioners.

The foregoing has been a disclosure of a current share circuit for power conditioners which provides for substantially equal current sharing between coupled power conditioners without adversely affecting voltage regulation.

Although the foregoing has been a description and illustration of specific embodiments of the invention, various modifications and changes thereto can be made by persons skilled in the art without departing from the scope and spirit of the invention as defined by the following claims.

What is claimed is:

1. A current sharing circuit for each of a plurality of parallel coupled power conditioners in a power system having respective error amplifiers for controlling the respective power conditioner outputs, the current sharing circuit for each power conditioner comprising:

filtering means responsive to a signal representative of the input current to the associated power conditioner for providing an averaged voltage signal indicative of the average load current for the associated power conditioner, wherein said filtering means comprises an operational amplifier with an output and an inverting input configured with a resistor and a capacitor connected in parallel between the output and the inverting input of said operational amplifier to provide an average representation of said signal representative of the input current to the associated power conditioner, reference means common to the current sharing circuits in the power system for providing a reference signal indicative of the average load current for the power system;

difference means for providing a difference signal indicative of the difference between the average load current and said averaged signal; and output means responsive to said difference signal and the associated power conditioner voltage output for producing a feedback signal for the error amplifier of the associated power conditioner.

2. The current share circuit of claim 1 wherein said reference means comprises summing node.

3. The current share circuit of claim 2 wherein said difference signal comprises a difference voltage signal.

4. The current share circuit of claim 3 wherein said difference means comprises an operational amplifier configured as a differential amplifier.

5. The current share circuit of claim 3 wherein said output means comprises means for adding said difference voltage and the power conditioner output voltage to produce said feedback signal.

* * * * *